June 7, 1932.  G. E. PURPLE  1,862,121
HOLDER FOR BELT FASTENING MEANS
Filed May 18, 1928
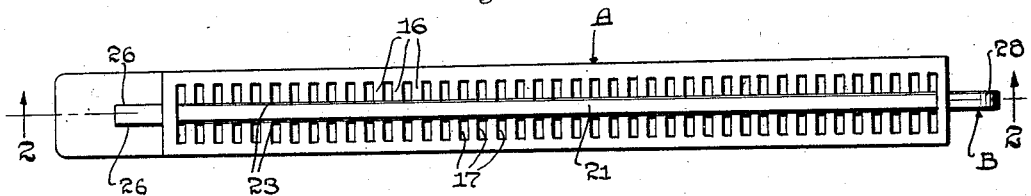
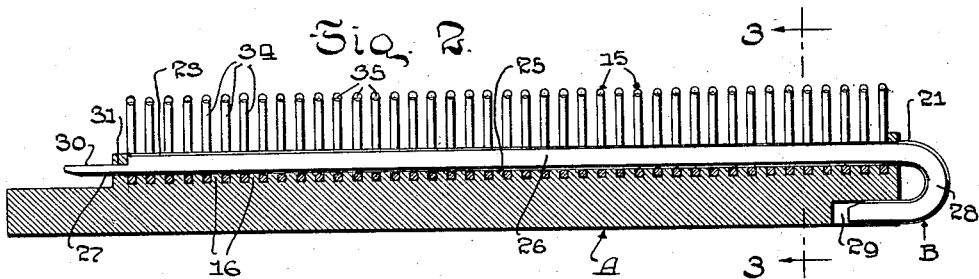
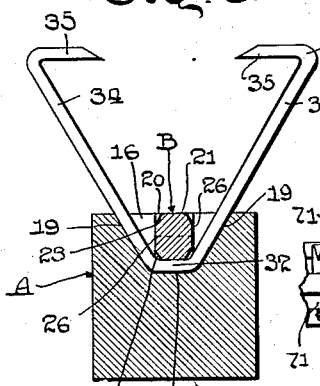
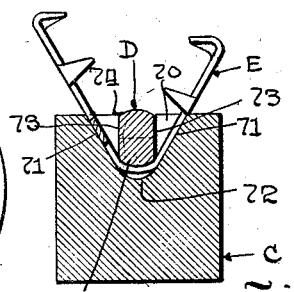
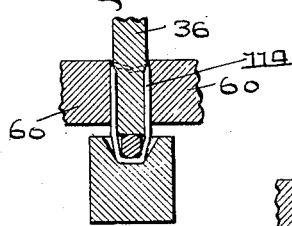
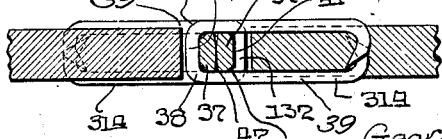
Witness
William P. Kilroy
Inventor,
George E. Purple.
By Joseph Harris
His Atty.

Patented June 7, 1932

1,862,121

UNITED STATES PATENT OFFICE

GEORGE E. PURPLE, OF LA GRANGE, ILLINOIS, ASSIGNOR TO FLEXIBLE STEEL LACING COMPANY, OF CHICAGO, ILLINOIS, A CORPORATION OF ILLINOIS

HOLDER FOR BELT FASTENING MEANS

Application filed May 18, 1928. Serial No. 278,676.

This invention relates to improvements in holders for belt fastening means.

In the art of applying belt fasteners and metallic lacings to the ends of belts, the general practice heretofore has been to employ a holder proper and a retaining pin, the latter functioning merely to temporarily keep the fasteners or lacings or hooks associated with the holder proper while the clinching operation takes place, after which the pin is withdrawn. All prior retaining pins, so far as I am aware, have been of ordinary cylindrical form and, while the holders proper have assumed different forms, partly on account of different styles of fastening means for which adapted, they have all possessed the common feature of a wall or base section, against which the rounded apex or angle portions of the fastening means bear when inserted in the holder proper, said wall or base section being adjacent the retaining pin when the latter is in place.

With prior types of holders, much difficulty has been encountered in attempting to obtain proper application of the fastening means to the belt ends. One cause is due to the fact that with retaining pins of cylindrical form, the fastening means, whether of the continuous lacing type or individual hook or staple type, shift in the holders circumferentially around the retaining pin while being deformed. Consequently, the fastening means are not properly alined with respect to the end of the belt or for the reception of the hinge connecting pin.

Another cause is the failure to maintain uniform bending or deformation of the fastening means in their apex or angle portions, the cylindrical retaining pin failing to act as a mandrel. This results in the applied fastening means having variable size and contour apex portions with which the hinge pin must co-act, and hence unequal wear and strain of the parts when in use.

One object of my invention is to provide a holder proper and retaining bar cooperable therewith so arranged that the belt fastening means are effectively held against shifting or displacement while they are being deformed and clinched to the belt end.

Another object of my invention is to provide a holder proper and cooperating retaining bar so constructed that the bar functions as a true mandrel during the clinching operation and the important apex portions of the fastening means which cooperate with the hinge pins, will be uniform as to size, shape and location when the clinching or attaching operation has been completed, to thus obtain an efficient long life connection betweeen the belt ends.

Another object of my invention is to provide a device of the character indicated in the foregoing, such that one device may be employed with equal efficiency for use with fastening means of different sizes and when attached to belts of different sizes.

Other objects of my invention are to provide a holding device of the character hereinbefore indicated which may be utilized or adapted for any of the well known commercial metallic types of belt fastening means and, further, to utilize the retaining bar as the gauging element for the belt end during the clinching operation.

In the drawing forming a part of this specification, Fig. 1 is a top plan view of my improved holding device. Fig. 2 is a vertical longitudinal sectional view, taken centrally of the holding device. Fig. 3 is a transverse vertical sectional view corresponding to the lines 3—3 of Fig. 2, but of approximately double the scale. Fig. 4 is a broken top plan view of a holder, showing a different form of retainer and gauge bar embodying my invention. Fig. 5 is a vertical sectional view, corresponding to the line 5—5 of Fig. 4. Figs. 6 and 7 are diagrammatical views, illustrating the manner of applying fasteners to belts which are thicker and thinner, respectively, than the gauge bar, these figures illustrating more particularly the function of the bar as a mandrel. And Fig. 8 is a sectional view of two belt ends attached by fasteners applied by the use of my improvements.

In said drawing, and referring first to the construction illustrated in Figs. 1, 2 and 3, the holder proper is designated generally by the reference character A and the combined retaining gauge pin or bar by the reference character B. In actual practice, the holder proper A will preferably be formed as a die casting, with the details of construction thereof as hereinafter more specifically pointed out.

The holder illustrated is shown adapted for use with belt fastening means of the hook or staple type, one of which is shown at 14 and others of smaller size at 15. In accordance therewith, the holding device proper has a series of alternate partitions 16 and slots 17, the slots being of a width corresponding to the thickness or gauge of the metal used in the staples. The slots 17, as shown in Fig. 3, are of trapezoidal outline with a bottom flat wall or surface 18, and upwardly diverging side walls 19—19. The partitions 16 are cast so as to provide rectangular recesses 20 for the reception of the retaining bar B and of such size that the top surface 21 of the retaining bar will lie flush with the tops of the partitions 16.

The retaining bar B is of generally rectangular cross section, as indicated in Fig. 3, the same having a flat bottom face or surface 25 opposed to and spaced from the flat bottom wall of the recesses a distance corresponding to the thickness or gauge of the metal used in the fastening means. In addition, the retaining bar B preferably has vertical and parallel side walls 26—26, the lower corner edges of the bar being slightly chamfered or beveled as indicated at 27—27, and the upper corner edges are similarly chamfered or beveled as indicated at 23—23.

The bar B is removable with respect to the holder proper A and may be detachably associated with the latter in any suitable manner. One means of accomplishing this is best shown in Fig. 2 where the bar B has a rounded loop end 28 which fits within a recess 29 at the corresponding end of the holder proper A. At its other end, the bar B is cut away as indicated at 30, thus leaving a finger which enters a corresponding recess 31 at the opposite end of the holder A.

The holder A is shown detached in the drawing but, as will be understood by those skilled in the art, the same may be used in any suitable machine or device for clinching the belt fastening means proper. Preferably, also, the bar B is not truly square in cross section, as clear from Fig. 3, this being done to prevent improper insertion of the bar within the recesses provided therefor in the partitions.

In using my said improved holding device, the same is done with fastening means that are initially provided with a flat apex portion 32 and diverging side arms 33 and 34, the latter having inturned prongs 35—35 which enter the belt and are clinched therein. Although I have illustrated in the drawing staples or hooks of common form, the invention may be used with fastening means or lacings of the continuous plate or strip type, it only being necessary to modify the recess in the holder proper which receives the same.

With my improvements, as the fastening means are deformed and clinched to the belt, the end of which will be gauged by the retainer bar B, as shown in Figs. 6 and 7, where portions of belts are indicated at 36 and 136, the diverging arms of the fastening means will be brought together into approximately parallel relation. During this clinching operation, it is evident that the fastening means have their apex portions firmly secured within the holder proper and there cannot be any shifting or displacement laterally or circumferentially with respect to the retaining bar. The proper alinement and positioning of the fastening devices is thereby positively maintained during the clinching operation, thus assuring the proper location and alinement of the fastening means with respect to the belt end at the conclusion of the clinching operation.

Another important feature resides in the fact that the apex portions of the fastening means will be formed to a definite, predetermined, fixed, uniform size and contour by the retaining bar which functions as a true mandrel for this purpose. Referring to Fig. 6, where the end portion 36 of a belt is indicated of greater thickness than the width of the bar B, it will be observed that the hooks or staples 114 have their lower or apex portions conformed to the flat bottom face and lower beveled corners of the bar B as the grippers 60 force the prongs of the fasteners into the belt. It will further be observed that the location of the apex portions of the fasteners is accurately determined by the gauge bar B against which the end of the belt is abutted during the applying operation, and, further, that said apex portions are centered with respect to the end of the belt.

Referring to Fig. 7, the end portion 136 of a thinner belt is indicated, the holder proper A and the gauge and retaining bar B being the same. In this instance, the fasteners 214 are not only conformed to their proper shape at their apex portions by the bar B functioning as a mandrel, but also the portions of the fasteners indicated at 62—62 will be necked-in and conformed about the beveled upper corner edges of the bar B when the grippers 60 press the prongs of the fasteners into the belt. In this instance, also, the apex portions are centered or aligned with the belt end and located at the proper distance therefrom by the bar B, which both gauges the fasteners and acts as a mandrel therefor.

In Figure 8 are shown two belt ends assembled and attached by fasteners applied by the use of my improvements, the rocker pin illustrated in Fig. 8 being of the type shown and claimed in my prior Patent 1,594,691 of August 3, 1926. As there shown, the rocker pin comprises two sections 37—37, each of which has side faces 40—40 diverging at a definite angle from the flat side 41 toward the rounded side 42. It will be noted that the hooks or staples 314—314 have corresponding flat apex portions 132, diverging corner portions 38—38, and thence extend parallelly, as indicated at 39—39. The diverging portions 38 conform to the diverging sides 40 of the rocker pin sections and hence a snug fit between a rocker pin section and the corresponding apex portions of the fasteners is obtained, and relative flexing between the two belt ends will result in the two rocker pin sections rolling or rocking on each other and without slippage of the fasteners with respect to the rocker pin section located in the apex thereof. In the Fig. 8 illustration, the fasteners are shown applied to belts of a thickness corresponding to the width of the retainer bar used therewith.

Referring now to the construction illustrated in Figs. 4 and 5, the holder proper is designated generally by the reference character C and the combined retainer and gauge pin or bar by the reference character D. In these figures, a belt lacing E of the continuous strip type is indicated.

The holder proper C will preferably be made as a die casting the same as in the case of the holder A, but, on account of being adapted for metallic belt lacing of the continuous strip type, there will be no partitions but an elongated recess 70 having upwardly diverging side walls 71—71 and a bottom wall preferably slightly concaved, as indicated at 72.

The retaining gauge pin D, in this construction, is slightly different in cross section from the pin or bar B, the bar D being preferably rolled down from round stock to a form having parallel side faces 73—73 and slightly convexed upper face 74 and slightly convexed bottom face 75. The upper face 74 will lie flush with the top of the holder C, as shown in Figure 5, the bar D thus serving as a gauge for the end of the belt during the application of the lacing E. The bar D is preferably provided with a loop hand hold 76 and is inserted endwise of the holder C in the usual manner. Due to its cross section, it is immaterial which face 74 or 75 is up, since the bar D is symmetrical about its horizontal axis.

With the holder C and bar D, it is evident that the lacing E is prevented from shifting or slippage, since it is held snugly between the lower face of the bar D and the bottom wall of the recess 70. Further, as the side arms of the lacing are pressed toward each other, the apex portions thereof will conform to the bottom section of the bar D and will be uniform as to size and location relative to the end of the belt which will be gauged by the bar D, as before stated. It is evident that the form of the invention shown in Figs. 4 and 5 is adapted for belts and lacings of different sizes, the same as in the case of the holder A and bar B.

Although I have herein shown and described what I now consider the preferred manner of carrying out my invention, the same is merely illustrative and I contemplate all changes and modifications that come within the scope of the claims appended hereto.

I claim:

1. A holding device for belt hooks comprising: a holder proper having series of alternating recesses and partitions in one face thereof, said recesses having flat bottoms and diverging sides and said partitions being provided with alined recesses to receive a retaining bar; and a retaining bar adapted to be positioned in said partition recesses, said retaining bar having a flat bottom surface and beveled corners.

2. A holding device for belt fastener means comprising: a holder proper having a recessed portion along one face thereof, the recessed portion being formed with a flat bottom and sides diverging upwardly therefrom; a retaining bar adapted to be disposed lengthwise in said recessed portion, said retaining bar having also a flat bottom side and adjacent chamfered corners; and means on said holder proper for retaining said bar in operative position.

In witness that I claim the foregoing I have hereunto subscribed my name this 8th day of May, 1928.

GEORGE E. PURPLE.